K. W. ROHLIN.
DEVICE FOR REGISTERING, RECORDING, AND INDICATING THE FLOW OF LIQUIDS.
APPLICATION FILED JULY 26, 1918.

1,321,671.

Patented Nov. 11, 1919.

Inventor:
Karl W. Rohlin,
by his Attorneys,
Howson & Howson

K. W. ROHLIN.
DEVICE FOR REGISTERING, RECORDING, AND INDICATING THE FLOW OF LIQUIDS.
APPLICATION FILED JULY 26, 1918.
1,321,671. Patented Nov. 11, 1919.
3 SHEETS—SHEET 2.
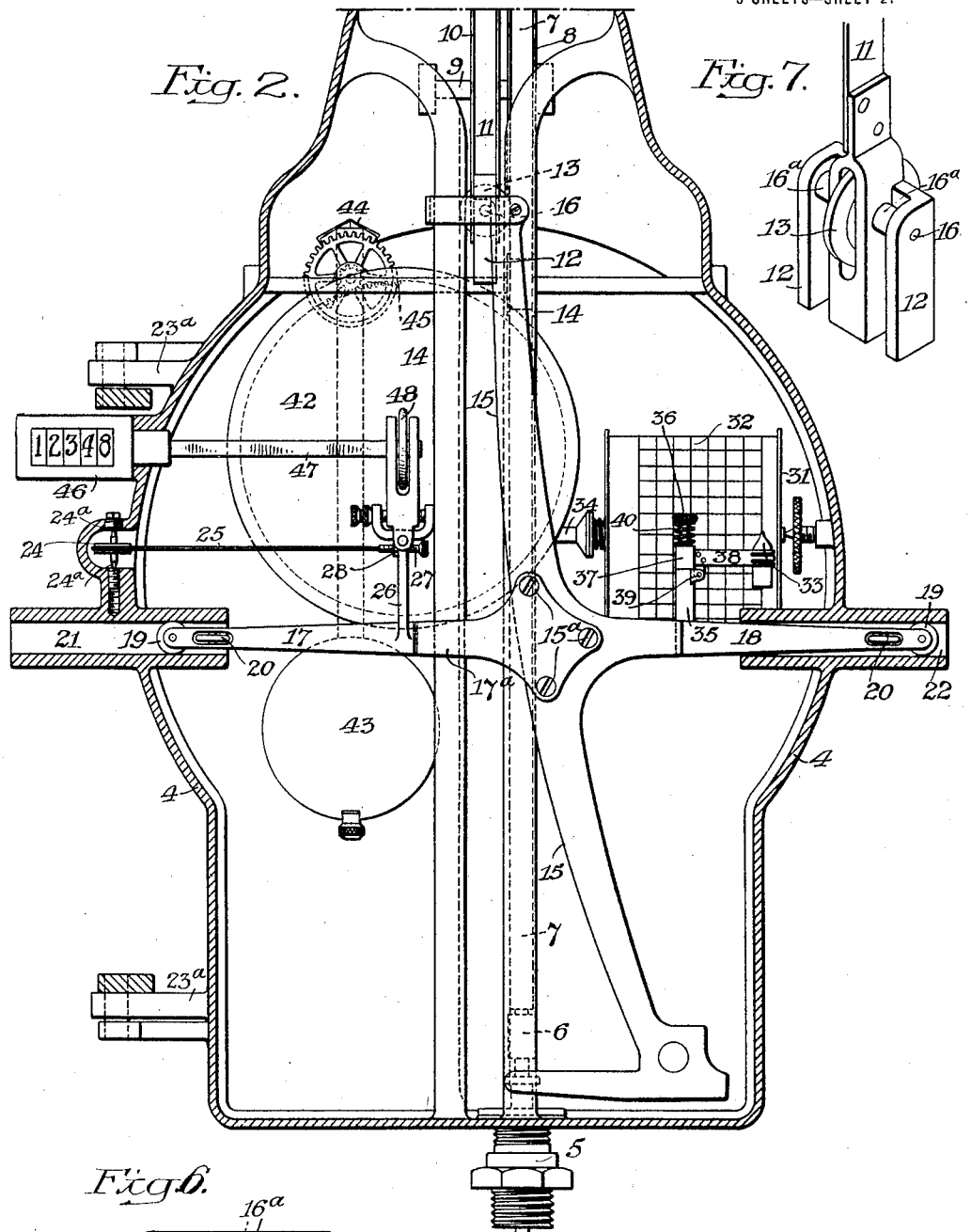
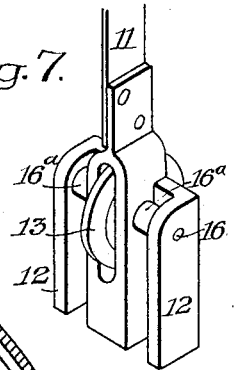
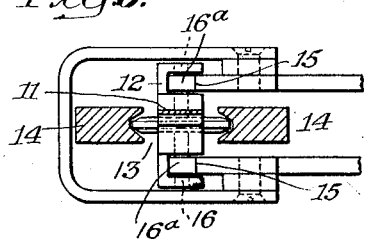
Inventor
Karl W. Rohlin,
by his Attorneys,
Howson & Howson K. W. ROHLIN.
DEVICE FOR REGISTERING, RECORDING, AND INDICATING THE FLOW OF LIQUIDS.
APPLICATION FILED JULY 26, 1918.
1,321,671.
Patented Nov. 11, 1919.
3 SHEETS—SHEET 3.
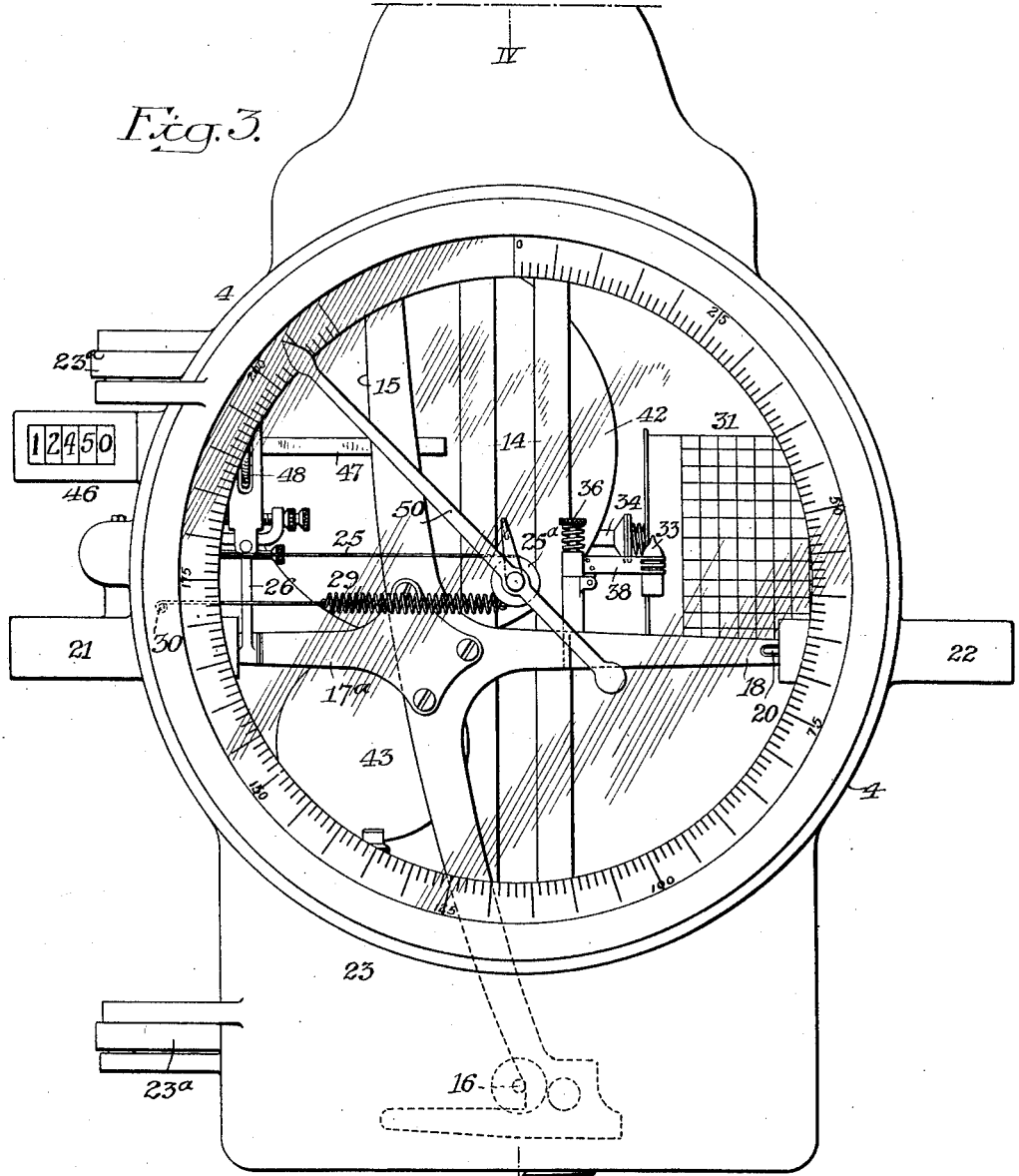

UNITED STATES PATENT OFFICE.

KARL W. ROHLIN, OF PHILADELPHIA, PENNSYLVANIA, ASSIGNOR TO WARREN WEBSTER & COMPANY, OF CAMDEN, NEW JERSEY, A CORPORATION OF NEW JERSEY.

DEVICE FOR REGISTERING, RECORDING, AND INDICATING THE FLOW OF LIQUIDS.

1,321,671.  Specification of Letters Patent.  Patented Nov. 11, 1919.

Application filed July 26, 1918. Serial No. 246,810.

*To all whom it may concern:*

Be it known that I, KARL W. ROHLIN, a citizen of the United States, residing in Philadelphia, Pennsylvania, have invented certain Improvements in Devices for Registering, Recording, and Indicating the Flow of Liquids, of which the following is a specification.

My invention relates to the measurement of flowing liquids; and the object of my invention is to provide simple and compact mechanism of an improved type, preferably inclosed in a casing, for registering, recording and indicating the flow of liquids.

While the improvements forming the subject of my invention may be employed in connection with the flow of any liquid desired to be measured, the mechanism has been designed more particularly for the purpose of registering, recording and indicating the flow of hot water delivered from feed water heaters for passage to steam boilers or storage tanks.

While my improved structure has been designed for use in connection with a V-notch weir of sharp angle construction mounted in the path of quietly flowing water and in which the varying height of the surface level of the water flowing over the weir in any period of time is made a function of the formulæ for determining the volume of flow in pounds, other forms of meters of the Venturi tube type, the Pitot tube type, rectangular weirs, submerged weirs and the like, with such modifications in the connections as are necessary to coördinate devices of this character with my improved mechanism, may be employed.

These and other features of my invention are more fully described hereinafter, reference being had to the accompanying drawings, in which:

Fig. 2, is an enlarged sectional elevation of my improved metering device.

Fig. 3, is a front elevation looking in the same direction as Fig. 2, with certain parts of the mechanism in another position.

Fig. 5, is a plan view of a portion of the structure, and

Figs. 6 and 7, are views illustrating details of my invention.

Figure 4:
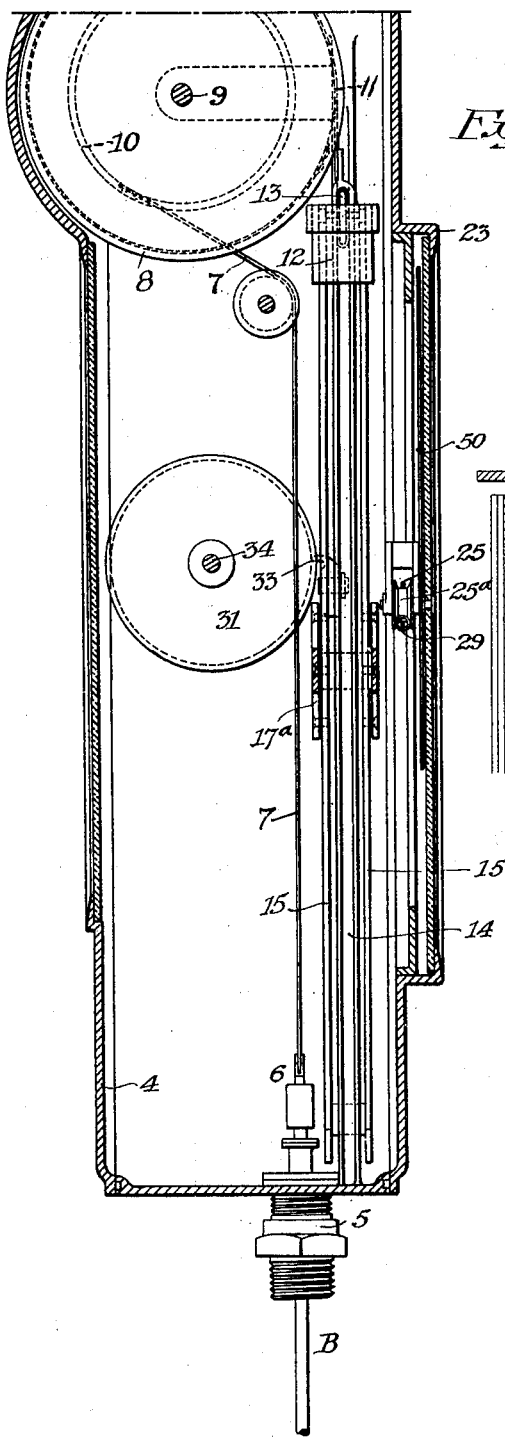
Fig. 4, is a sectional elevation on the line IV—IV, Fig. 3.

In the use of structures of this character, a float A, usually submerged, is disposed in a compartment 1 of a tank 2 into which water is admitted from a main approach, which may be through a suitable opening (not shown), and registers the varying heads indicated by "H" as the water flows over a V-notch weir 3 forming the outlet from a second compartment 1$^a$ within the tank in free communication with the first-named compartment. The arrangement of the tank and the compartments therein, together with the float, is shown in the pending application of W. H. Lukens, filed January 17, 1918, Serial No. 212,279.

Above the tank 2 or other structure having the compartments through which the water to be measured flows, or mounted at any convenient point with reference thereto, is a casing 4 for the registering, recording and indicating mechanism constituting my invention; the same being set with care with the various parts and structural elements in definite position, vertically and horizontally, as conditions connected with the operation of the structure may require.

Attached to the float A is a rigidly connected rod B, which passes out of the tank through the bottom of the instrument case; the latter being provided with a suitable gland 5 to prevent entrance of any steam or vapor that would injuriously affect the operation of any part of the mechanism within such case since structures of this type are designed for use under conditions where the presence of steam and injurious vapors cannot be avoided.

The upper end of the rod B extends well into the case and is attached by a suitable coupling 6, which may be of any desired character, to a flexible steel tape 7, or equivalent element, the opposite end of which is connected to and moved by a pulley 8 mounted on a shaft 9. In addition, this shaft 9 carries a pulley 10 to which is attached a flexible steel tape 11, or equivalent element, the opposite end of which is connected to a vertically movable carriage 12, having a roller 13 adapted to engage a pair of vertical members 14 located within the casing and forming a trackway or rails for said carriage or its roller. This carriage is so connected with the operating means that as the float rises and lifts the rod B, the said carriage will descend, and it may be weighted.

In order that the vertical movement of the float may translate changes in the head of flow into figures for observation; recording the flow continuously on a rotatable record sheet; indicating the rate of flow on the face of the instrument, and registering the total volume of flow upon a suitable disintegrating device, I have provided a movable cam 15, the face of which constitutes a flow curve which lies in position for coöperative engagement with a pin 16 suitably mounted upon the carriage 12. This cam, which may comprise a pair of members disposed side by side, is mounted for lateral movement with reference to the vertical axis of the casing, and to this end it is provided with arms 17 and 18; the arm 17 being preferably an attached piece, and these arms may carry at their extremities rollers 19 and 20, adapted to tubular guides or passageways 21 and 22 carried by the casing. The inner end of the arm 17 is preferably yoked as indicated at 17$^a$, whereby it may be connected to the cam 15 by screws 15$^a$, or other suitable means.

The front or cover plate 23 of the casing may be hinged to ears 23$^a$ at the sides of the same, and disposed in axial alinement with respect to the pivots of said hinges and preferably intermediate the same, is a small pulley 24, mounted preferably on cone bearings 24$^a$, around which passes a cord 25; one end of the same being connected to the arm 17 of the cam; the latter having a post 26 receiving a threaded stem 27 to which said cord may be attached, and said stem having a lock nut 28 so that considerable delicacy of adjustment can be assured. The opposite end of this cord passes around a small pulley 25$^a$ centrally mounted on the glass face of the casing, and is connected to a spring, which may be of the coil type indicated at 29, and which spring may be anchored to the rim of the casing cover at 30. Under the action of the spring, the tendency of the cam is to move toward the left, as the arrangement herein indicates, indicating rises in the head of the flowing liquid; hence, since such rise causes the carriage 13 with its pin 16 in contact with the cam 15 to lower, such cam is kept in proper position by the spring 29. While I have referred to a pin 16 as in contact with the cam 15, it will be understood that such pin has double contact with the cam; the latter being double or duplex as fully illustrated in the drawings, and that by preference said pin is provided with antifriction rollers 16$^a$.

The recording device may comprise a drum 31 of the usual type having a removable sheet 32 upon which the curve of flow may be traced by a pen 33. This drum may be carried by a shaft 34, and is preferably mounted so as to be readily removable for the insertion of a fresh sheet. The pen is carried directly by a portion of the cam. To this end the arm 18 of the latter may have a post 35 receiving a threaded stem 36 passing through a hub 37 of an arm 38, pivoted at 39 to the post 35; which arm carries at its opposite end the pen 33. The stem 36 may be provided with a spring 40 between its head and the hub 37 so that the pen will be yieldingly supported. By loosening the screw stem 36 from its engagement with the post 35, the arm carrying the pen may be readily swung out of engagement with the record sheet on the rotating drum.

The rotating drum is driven by suitable spring-driven clock-work mechanism in a manner similar to the movement of structures of this type, and the shaft 34 may carry a pinion from which a suitable friction disk 42 may be driven in unison with the chart drum.

The power of the spring-driven clockwork mechanism is operatively connected to a suitable train of gears; the speed and extent of movement of said spring-driven mechanism being regulated through this gear train by a pendulum 43. This pendulum may be operated by a dead beat escapement 44 which rotates a spur wheel 45 carrying the friction disk 42.

An integrator 46 of any usual construction for registering the total volume of water flowing over the weir in any given time may be carried by the casing frame, and may be provided with a square shaft 47. The arm 17 of the cam 15 carries a friction wheel 48 in operative engagement with the friction disk 42; being supported by the post 26, and this friction wheel is arranged to travel on said square shaft 47. Under the movement of the cam 15, said friction wheel is traversed from the center of the disk radially toward its periphery and back; dependent upon the movement of the cam. Hence the speed of the registering train of said integrator will be varied according to changes in the surface level of the water flowing over the weir affecting the position of the cam through the mechanism described.

Figure 1:
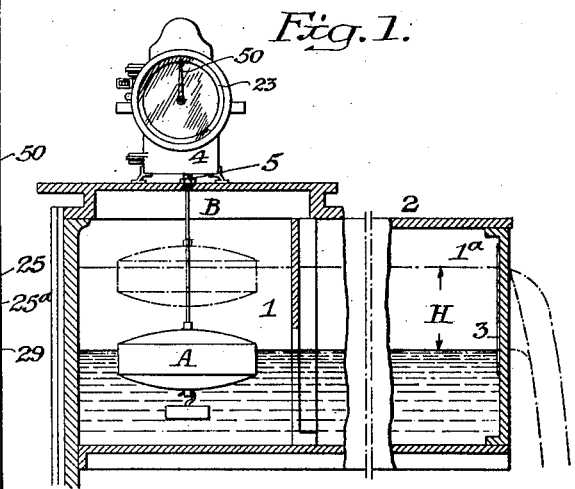
Figure 1, is a view in elevation of an improved metering device embodying my invention which is designed to be mounted with respect to a chamber or chambers receiving flowing water with the metering mechanism connected to a float in one of said chambers; the other chamber having a V-notch weir over which the water flows.

The operation of my improved structure is as follows: When no water is flowing through the V-notch weir, the float will be at zero or in the position shown in full lines, Fig. 1, of the drawings. As the volume of water increases in the weir tank, it will be seen that the head "H" will increase and the float A will rise and maintain the same relation to the surface of the floating liquid as it had in its floating position while at zero. When the float rises, the motion is transmitted through float rod B to the flexible steel tape or other element 7, which in turn revolves the pulley 8 on the shaft 9, and the wheel 10 carrying the tape or other element 11, to which is attached the carriage 12 with its wheel 13 adapted to the rails 14. The cam 15, under the influence of the spring, tends to move to the left as the carriage 12 lowers; the rollers 16ᵃ of its pin 16 following the surface of the cam. When the float falls, the carriage 12 will be lifted and the cam will be moved in the opposite direction or to the right.

The arms 17 and 18 rigidly fixed to the cam will also move; the one carrying the pen causing it to record upon the drum chart, and such drum being revolved away from the pen will thus cause a line indicating the varying flow of water over the V-notch weir to be recorded upon its surface. At the other side of the cam, the friction wheel 48 will be carried across the face of the friction disk 42 which is revolving in such manner that the quantity recorded on the chart will be registered by the wheels of the integrating device 46. At the same time, an indicating arrow 50 movable with the pulley 25ᵃ on the glass face of the casing will move and indicate the varying quantities represented by the changing heads H on the V-notch weir; giving instantaneous quantitative readings.

The above description of the operation of my improved mechanism gives a clear idea of the manner in which this instrument translates the well known formula for the flow of water over a 90° V-notch, which is $$Q = CH^{\frac{5}{2}}$$

in which Q represents the quantity of water per second; C the constant, and H the head or height of water flowing over the weir into quantities for a given time; combining a registering dial, a recording chart, and an instantaneous indicator.

While my improved mechanism has been described with reference to a V-notch of 90°, it will be understood that notches having volumetric areas equaling half 90°, quarter 90°, or eighth 90°, may be employed; the improved mechanism described taking care of such changes in the size of the weir when set for the changed condition; the head of liquid at the quantity in pounds per hour to be measured being known prior to setting such mechanism.

Assuming for instance that it is desired to measure 200,000 lbs. of water per hour, I may employ a 90° V-notch weir, with a head of 8″, and a temperature range up to 212°. My improved mechanism, set to register, record, and indicate readings of any part of this quantity of water, may be employed to register, record, and indicate a delivery of one-half the quantity, or 100,000 lbs. per hour with a head of 8″, by simply changing the V-notch weir from a full 90° to half 90°. However, should the change desired be in amounts less or greater than an exact halving or multiple of the quantity delivered under the known conditions of V-notch area and head above noted, other factors must be considered, and for this purpose the gearing between the drum shaft and the friction disk would require change. Such other changes as may be necessary to adapt my improved structure to other conditions I deem to be within the scope of my invention.

It will be understood, of course, that changes may be made in the various details of construction without departing from my invention, and that while definite embodiments of my invention have been shown in the accompanying drawings and described with more or less particularity, I do not wish to be limited to the constructions disclosed; desiring to claim broadly any construction capable of performing the function for which my improved device for registering, recording and indicating the flow of liquids has been designed.

It will also be understood that while I have shown flexible bands or tapes connecting the pulleys with the rod B and the carriage 12, other forms of connecting means may be employed, and that in some instances the operation of the structure may be reversed; that is to say, the rise of the float may be arranged to effect a corresponding rise in the carriage having the pin 16 in engagement with the cam member whose movement under the influence of the spring may be in a direction opposite to that indicated in the drawings, and such structure is intended to be within the scope of the appended claims.

While I have shown an integrating device occupying a fixed position with respect to the casing, with a squared shaft extending into the casing and carrying the laterally movable friction member whereby the integrating wheels may be moved; the said integrating device may be arranged to move laterally and carry the friction member with it as the latter rotates by its engagement with the friction disk 42.

I claim:

1. In a device for registering, recording and indicating the flow of liquids, the combination of a vertically movable float, a cam laterally movable with respect to the movement of the float, coöperating means between said float and cam whereby lateral movement is imparted to the cam coincident with the rise and fall of the float, and means for translating the movement of said cam into data indicating rate, volume, and amount of flow.

2. In a device for registering, recording and indicating the flow of liquids, the combination of a vertically movable float, a laterally movable cam, coöperating means between said float and cam whereby the latter may move under the rise and fall of the float, and means for translating the movement of said cam into data indicating rate of flow.

3. In a device for registering, recording and indicating the flow of liquids, the combination of a vertically movable float, a laterally movable cam, coöperating means between said float and cam whereby the latter may move under the rise and fall of the float, and a time-controlled element upon which the volume of flow may be recorded.

4. In a device for registering, recording and indicating the flow of liquids, the combination of a vertically movable float, a laterally movable cam, coöperating means between said float and cam whereby the latter may move under the rise and fall of the float, and an integrating device controlled by said cam for registering the amount of flow.

5. In a device for registering, recording and indicating the flow of liquids, the combination of a float actuated by the head of flowing liquid, a cam laterally movable with respect to the movement of the float, means for moving the cam operatively connected with the float, means for restraining the movement of said cam, and indicating means operated by the movement of said cam.

6. In a device for registering, recording and indicating the flow of liquids, the combination of a float actuated by the head of flowing liquid, a cam laterally movable with respect to the movement of the float, means for moving the same in one direction, means independent of the float for restraining the movement of said cam in said first direction and arranged to move the cam in the opposite direction, and flow indicating means operated by the movement of said cam.

7. In a device for registering, recording and indicating the flow of liquids, the combination of a float actuated by the head of flowing liquid, a cam laterally movable with respect to the movement of the float, means for moving the cam in one direction operatively connected with the float, independent means for restraining the movement of said cam, and flow indicating means operated by the movement of said cam.

8. In a device for registering, recording and indicating the flow of liquids, the combination of a float actuated by the head of flowing liquid, a cam laterally movable with respect to the movement of the float, means for moving the same in one direction, means for restraining the movement of said cam in said first direction and for moving it in the opposite direction, time-controlled means for recording the flow, and means for marking thereon operated by the movement of said cam.

9. In a device for registering, recording and indicating the flow of liquids, the combination of a vertically movable float actuated by the head of flowing liquid, a cam laterally movable with respect to the movement of the float, restraining means therefor, a guide for said restraining means; the latter being adapted to drop as the front rises, and means controlled by the cam for indicating, registering and recording the flow.

10. In a device for registering, recording and indicating the flow of liquids, the combination of a vertically movable float actuated by the head of flowing liquid, a cam laterally movable with respect to the movement of the float in a horizontal or substantially horizontal direction, restraining means for said cam, a guide for said restraining means; the latter being adapted to drop as the float rises and rise as the float drops, an integrating device, time-controlled means for actuating the same, and means controlled by the lateral movement of the cam for transmitting the motion of said time-controlled means to the integrating device.

11. In a device for registering, recording and indicating the flow of liquids, the combination of a float actuated by the head of flowing liquid, a cam laterally movable with respect to the movement of the float in a horizontal or substantially horizontal direction, restraining means for said cam, a guide for said restraining means; the latter adapted to drop as the float rises, and a spring for moving the cam as the restraining means lower.

12. In a device for registering, recording and indicating the flow of liquids, the combination of a float actuated by the head of flowing liquid, a cam laterally movable with respect to the movement of the float in a horizontal or substantially horizontal direction, frictional restraining means for said cam, a guide for said restraining means; the latter adapted to drop as the float rises and rise as the float drops, and an arrow controlled by the cam for indicating the rate of the flow.

13. In a device for registering, recording and indicating the flow of liquids, the combination of a vertically movable float actuated by the head of flowing liquid, a cam laterally movable with respect to the movement of the float and controlled thereby, and guiding means for maintaining the movement of said cam in a horizontal direction.

14. In a device for registering, recording and indicating the flow of liquids, the combination of a float actuated by the head of flowing liquid, a laterally movable cam controlled thereby, laterally extending arms carried by said cam, and guiding means for said arms for maintaining the movement of said cam in a horizontal direction.

15. In a device for registering, recording and indicating the flow of liquids, the combination of a float actuated by the head of flowing liquid, a laterally movable member having a pair of cam surfaces controlled thereby, guiding means for maintaining the movement of said cam member in a horizontal direction, and anti-friction rollers carried by said cam member and adapted to said guiding means.

16. In a device for registering, recording and indicating the flow of liquids, the combination of a float actuated by the head of flowing liquid, a laterally movable cam controlled thereby, guides for maintaining the movement of said cam in a horizontal direction, and a vertically movable member for effecting movement of said cam in one direction.

17. In a device for registering, recording and indicating the flow of liquids, the combination of a vertically movable float, a laterally movable cam, coöperating means between said float and cam whereby the latter may move under the rise and fall of the float, means for translating the movement of said cam into data indicating rate, volume, and amount of flow, and a spring for moving said cam as the float rises.

18. In a device for registering, recording and indicating the flow of liquids, the combination of a vertically movable float, a cam laterally movable with respect to the movement of the float, and coöperating means between said float and cam whereby the latter may move under the rise and fall of the float, and a spring for moving the cam in one direction.

19. In a device for registering, recording and indicating the flow of liquids, the combination of a float actuated by the head of flowing liquid, a laterally movable cam, a spring for moving the same as the float rises, means for restraining the movement of said cam effected by the spring and for moving it in the opposite direction, and indicating means operated by the movement of said cam.

20. In a device for registering, recording and indicating the flow of liquids, the combination of a float actuated by the head of flowing liquid, a laterally movable cam, means for supporting it horizontally during its lateral movements, restraining means for said cam; said restraining means being adapted to drop as the float rises and rise as the float drops, an integrating device, means for actuating said integrating device, and means controlled by the position of the cam for transmitting the motion of said actuating means to the integrating device.

21. In a device for registering, recording and indicating the flow of liquids, the combination of a float actuated by the head of flowing liquid, a laterally movable cam, weighted restraining means therefor operatively connected to said float, a guide for said restraining means; the latter adapted to drop as the float rises, and a spring for moving the cam as the restraining means lower.

22. In a device for registering, recording and indicating the flow of liquids, the combination of a float actuated by the head of flowing liquid, a cam laterally movable in a horizontal direction, a vertically movable member controlled by said float for effecting movement of said cam in one direction, and a spring for moving said cam in the opposite direction.

KARL W. ROHLIN.